US009418340B2

(12) United States Patent
Vasseur et al.

(10) Patent No.: US 9,418,340 B2
(45) Date of Patent: Aug. 16, 2016

(54) FAST LEARNING TO TRAIN LEARNING MACHINES USING SHADOW JOINING

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Jonathan W. Hui, Belmont, CA (US); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 13/926,526

(22) Filed: Jun. 25, 2013

(65) Prior Publication Data

US 2014/0222725 A1    Aug. 7, 2014

Related U.S. Application Data

(60) Provisional application No. 61/761,110, filed on Feb. 5, 2013.

(51) Int. Cl.
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| 5,459,716 | A * | 10/1995 | Fahim et al. ................. 370/228 |
| 6,212,613 | B1 | 4/2001 | Belair |
| 6,950,427 | B1 * | 9/2005 | Zinin ............................. 370/386 |
| 7,423,986 | B2 | 9/2008 | Grayson et al. |
| 8,102,814 | B2 | 1/2012 | Rahman et al. |
| 8,305,996 | B2 | 11/2012 | Rahman et al. |
| 2007/0258508 | A1 * | 11/2007 | Werb et al. ..................... 375/140 |
| 2008/0313450 | A1 | 12/2008 | Rosenberg |
| 2009/0010272 | A1 * | 1/2009 | Wijnands ................ H04L 45/02 370/408 |
| 2009/0059935 | A1 * | 3/2009 | Dec .............................. 370/401 |

(Continued)

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

(Continued)

*Primary Examiner* — Kakali Chaki
*Assistant Examiner* — Michael Zidanic
(74) *Attorney, Agent, or Firm* — Parker Ibrahim & Berg LLC; James M. Behmke; Stephen D. LeBarron

(57) ABSTRACT

In one embodiment, a node receives a request to initiate a shadow joining operation to shadow join a field area router (FAR) of a computer network, and preserves its data structures and soft states. The shadow joining operation may then be initiated to shadow join the FAR, wherein shadow joining comprises preforming join operations without leaving a currently joined-FAR, and the node measures one or more joining metrics of the shadow joining operation, and reports them accordingly. In another embodiment, a FAR (or other management device) determines a set of nodes to participate in a shadow joining operation, and informs the set of nodes of the shadow joining operation to shadow join the FAR. The device (e.g., FAR) participates in the shadow joining operation, and receives reports of one or more joining metrics of the shadow joining operation measured by the set of nodes.

23 Claims, 10 Drawing Sheets

(56) References Cited

U.S. PATENT DOCUMENTS

2009/0296571 A1* 12/2009 McCourt .................... 370/225
2013/0010615 A1   1/2013 Hui et al.

OTHER PUBLICATIONS

Vasseur, et al., "Fast Learning to Train Learning Machines Using Shadow Joining", U.S. Appl. No. 61/761,110, filed Feb. 5, 2013, 25 pages, U.S. Patent and Trademark Office.

* cited by examiner

FAST LEARNING TO TRAIN LEARNING MACHINES USING SHADOW JOINING

RELATED APPLICATION

The present invention claims priority to U.S. Provisional Application Ser. No. 61/761,110, filed Feb. 5, 2013, entitled "FAST LEARNING TO TRAIN LEARNING MACHINES USING SHADOW JOINING", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
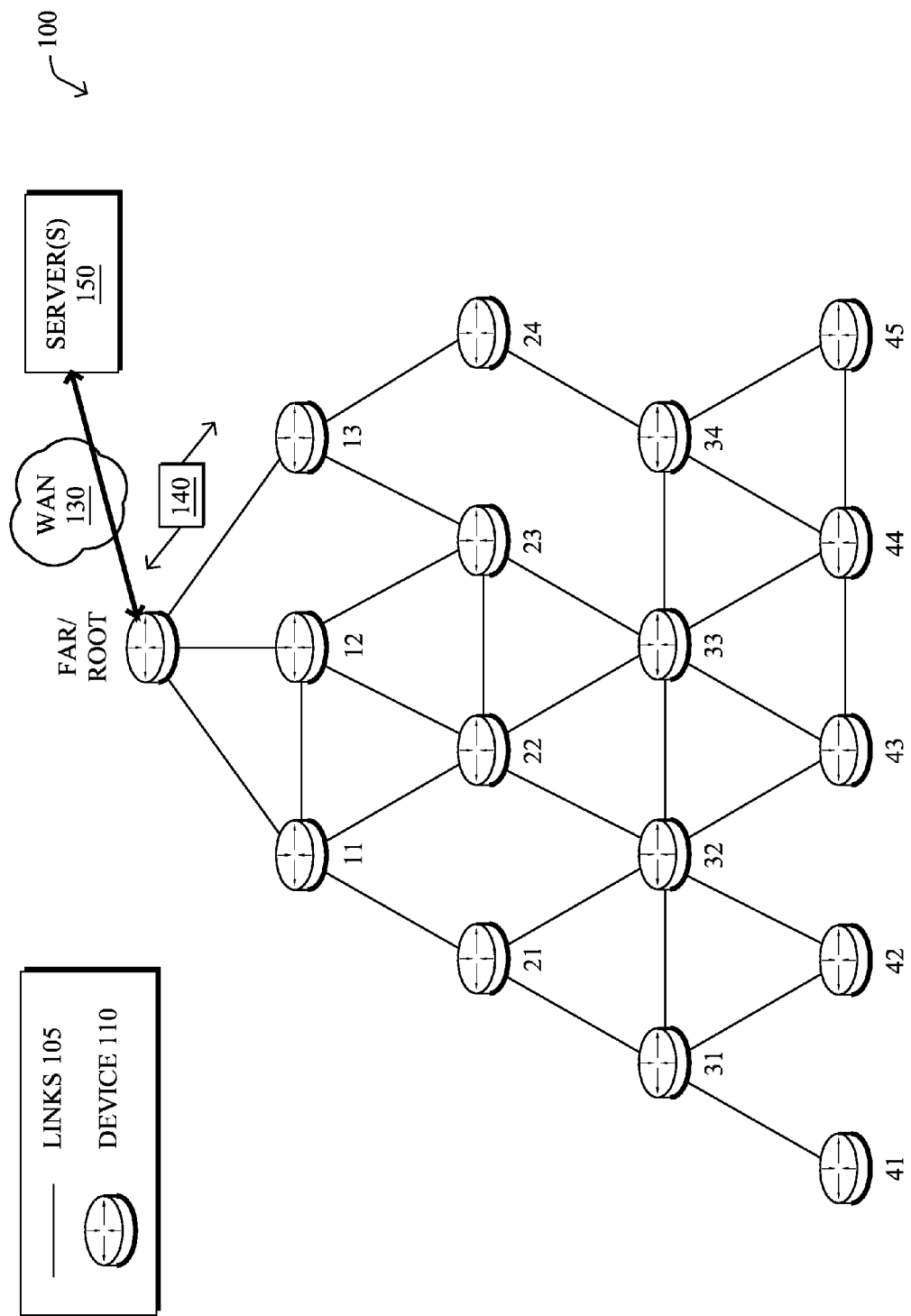
FIG. 1 illustrates an example communication network.

According to one or more embodiments of the disclosure, techniques are shown and described relating to fast learning to train learning machines using shadow joining. In one embodiment, a node receives a request to initiate a shadow joining operation to shadow join a field area router (FAR) of a computer network, and preserves its data structures and soft states. The shadow joining operation may then be initiated to shadow join the FAR, wherein shadow joining comprises preforming join operations without leaving a currently joined-FAR, and the node measures one or more joining metrics of the shadow joining operation, and reports them accordingly. In another embodiment, a FAR (or other management device) determines a set of nodes to participate in a shadow joining operation, and informs the set of nodes of the shadow joining operation to shadow join the FAR. The device (e.g., FAR) participates in the shadow joining operation, and receives reports of one or more joining metrics of the shadow joining operation measured by the set of nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
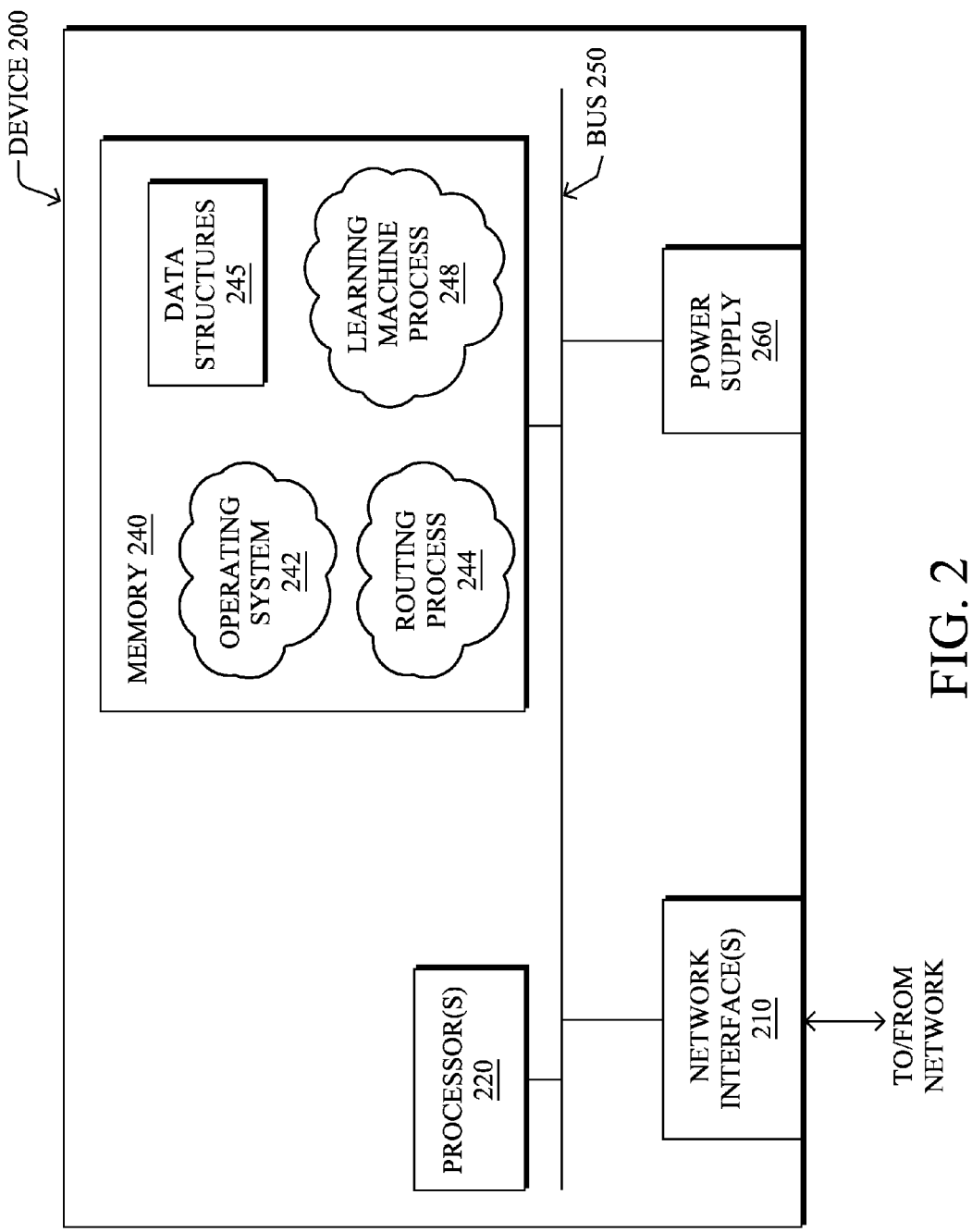
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
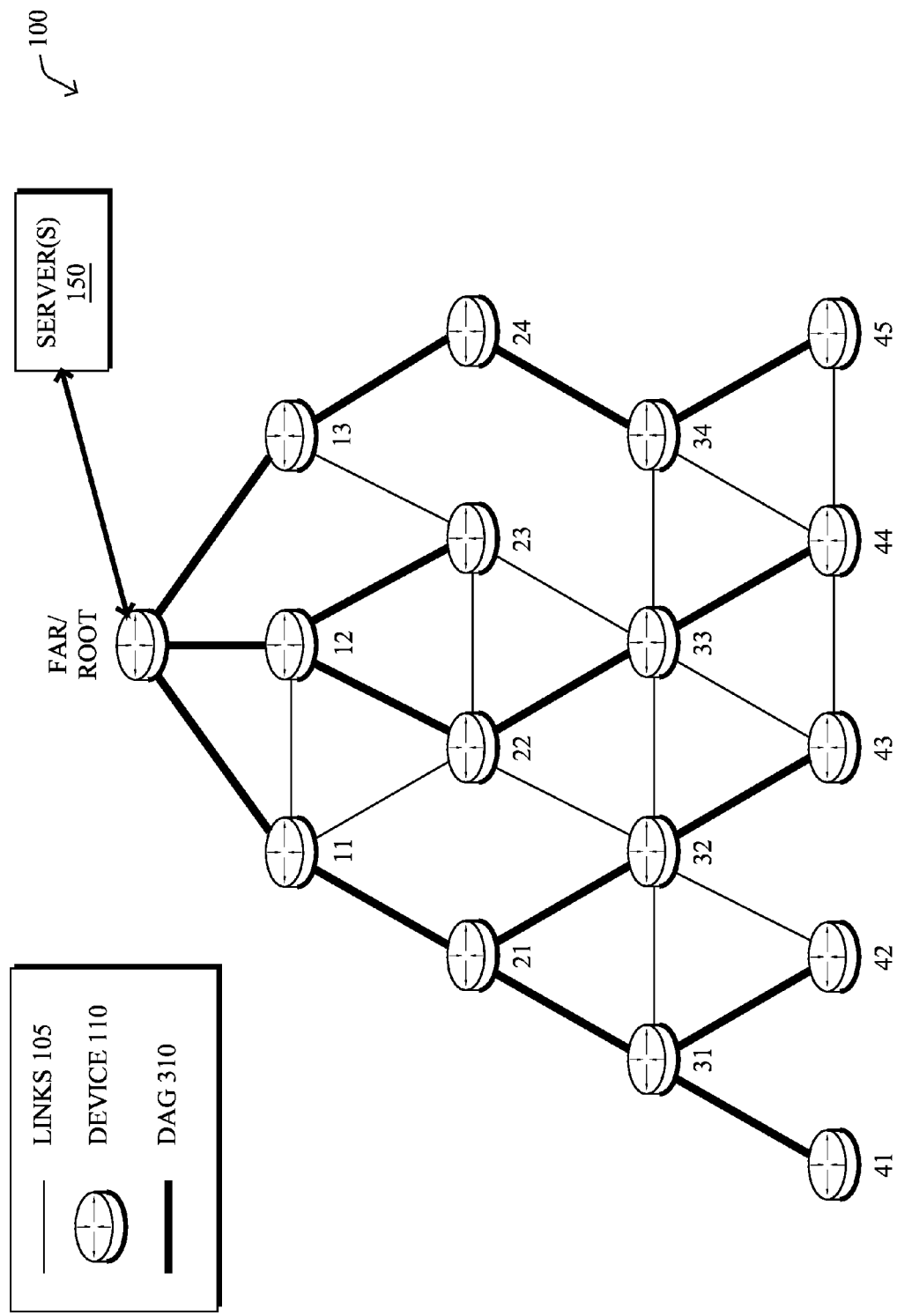
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

One of most critical performance metrics of LLNs perceived by end-users such as utilities, is the time for a node to join a network, thus directly impacting the time for the mesh to become operational, especially after a FAR reboot/crash. Indeed, in order to join a mesh, a typical LLN device must complete a number of steps:

1) Discover a PAN (i.e. a specific network in IEEE 802.15.4 terminology);
2) Perform 802.1x-based mutual authentication and obtain link security keys;
3) Discover a default route (e.g., by using RPL, which by itself involves a number of steps);
4) Configure a global IPv6 address (e.g., by using DHCPv6); and
5) Advertise a global IPv6 address to configure downward routes (e.g., by using RPL);

The ratio of LLN devices to FARs can be anywhere from 1000 to 5000 LLN devices for every FAR. As a result, each PAN will typically contain from 1000 to 5000 LLN devices. Furthermore, LLN deployments can be dense and LLN devices can easily have hundreds of neighbors. For these reasons, properly building a stable network topology can take tens of minutes, if not hours.

Figure 4:
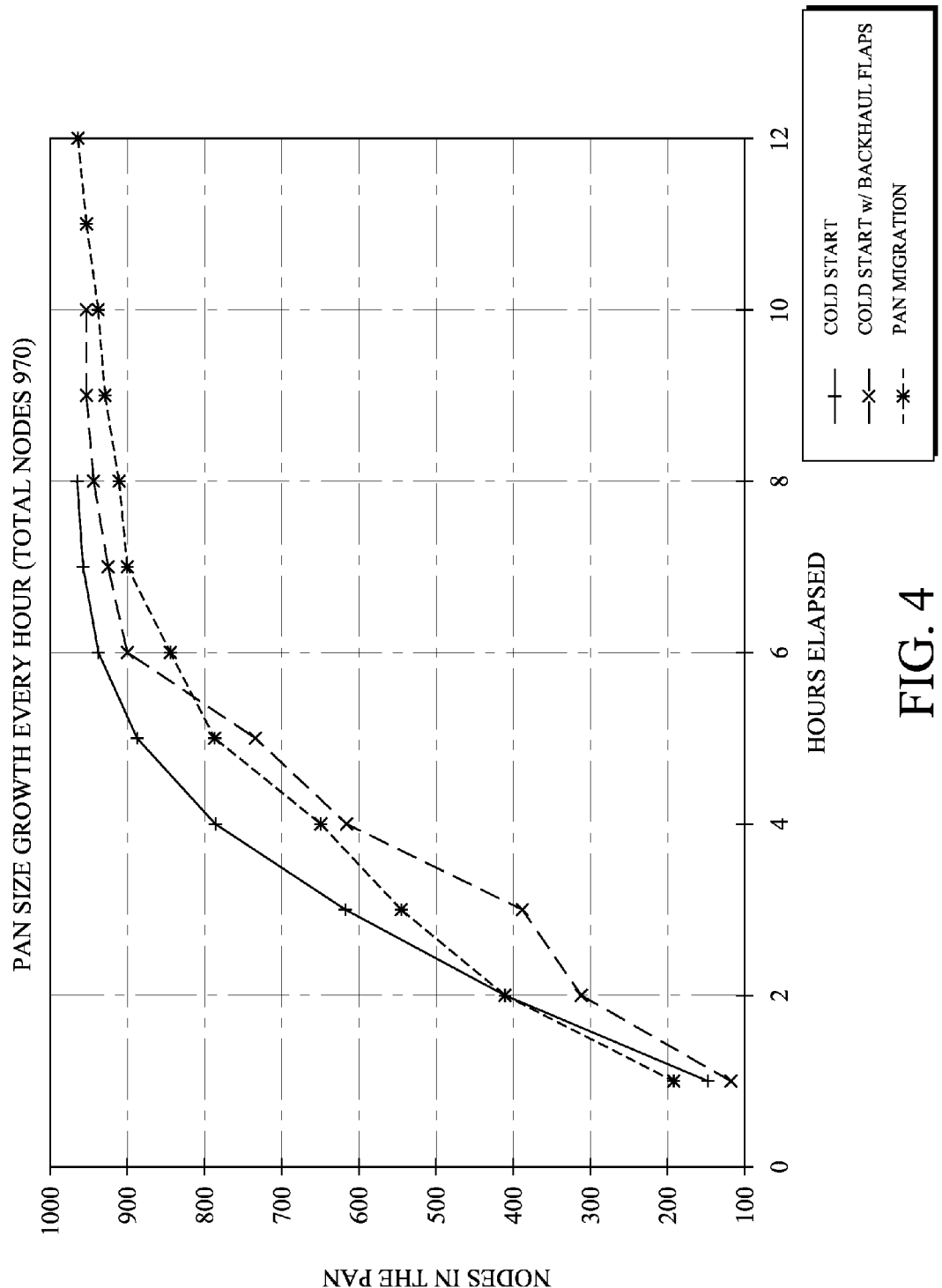
FIG. 4 illustrates an example of node join times

Note that the total time to make the network operational is unfortunately not a linear function of the number of nodes and time for each node to join the network (see FIG. 4). Indeed, these networks are using shared media, thus having thousands of nodes trying to join the LLNs may lead to major issues, not mentioning that some of these nodes may experience very poor quality paths to the FAR according to their distance and number of hops to the FAR. FIG. 4 shows the number of nodes joining a 1,000 node mesh as a function of time; even in a relatively small network (1,000) one can observe the non-linearity of the joining time.

Unfortunately, in steady state, opportunities for computing these joining times are extremely rare since joining times T[i] for node Ni can only be computed when nodes join the network after a Field Area Router (FAR) reboot (crash or software upgrades), when nodes reboot themselves after a firmware upgrade or when joining a PAN after a PAN migration. Observation of real-life deployed networks show that such events do not take place often enough to "train" the LM.

Regardless of the LM technique in use, in order to perform regression, the LM requires gathering training sets. The aim of the techniques herein is to gather training sets at a faster pace using "shadow joining" that would otherwise not be possible in steady state network. It is critically important, however, to stress the fact that the techniques herein for triggering a mesh reformation for gathering new joining times may also be used in order to gather other network metrics such as the time for a node migrate to another PAN.

Said differently, the techniques herein specify a newly defined PAN/Mesh formation mode referred to as the "Shadow Joining Mode" allowing a Learning Machine to "fast gather" training sets on an already formed and functional mesh. This is illustratively achieved by triggering a "fake" PAN/Mesh joining sequence in order to compute network performance metrics such as joining times T[i] (and infer link/node delays) that are ultimately provided to the Learning Machine. First the FAR determines the set of nodes that should trigger a shadow joining. Then the FAR informs all servers involved in PAN/Mesh joining that a shadow joining will be triggered, before sending a multicast/broadcast messages in the network requesting a set S of node to perform a shadow joining. The shadow joining operation is then triggered on the set S (e.g., at random times to avoid control plane traffic burst), which consists in performing all tasks involved in PAN formation, after flagging requests (e.g., IEEE 802.15.4, DHCP, RPL, CSMP, etc.) as a "fake" request to avoid allocation of actual resources. In another embodiment the FAR will request nodes to actually join a (fake) mesh. Measures are also taken to not alter QoS of priority traffic while performing PAN/Mesh formation that would lead to realistic network performance computation.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Notably, there are many networks where the most efficient way of gathering statistics about new joining times is only by performing a FAR restart because this starts mesh formation from the beginning. Unfortunately, there are networks where quiet periods are too rare thus requiring other techniques in order to prevent actual mesh restart. Note also that a FAR restart is perfectly acceptable even in the presence of critical traffic and no quiet periods if a system of multiple routing instances can be used to switch traffic seamlessly. In some networks however, FAR restarts are simply not a viable option because of the disruption that is caused.

Operationally, in order to overcome the issues that can be caused by FAR restarts, the techniques herein introduce a notion of "Shadow Mesh Joining" (SMJ). The SMJ technique consists of requesting the nodes to initiate a "shadow" mesh joining process. In this process, all the nodes would undertake the steps that are involved in re-joining the network but without any impact on their actual state. So, if a node already has parents and is authenticated into the network, it will continue to function as a part of the network, subject to network dynamics as usual during the shadow joining process.

As mentioned above, since there is no actual PAN reformation, the SMJ technique is non-disruptive and could be performed at any time (although some critical traffic may be slightly affected in terms of delay). Being aware of the kind of traffic that is transiting, a node may defer its shadow joining in this case.

Two mode of operations are specified:
1) The FAR may be requested to trigger shadow joining for all nodes in the network;
2) The FAR may trigger shadow joining for a subset S of the nodes in the network. This is to selectively gather information about clusters in the network. It is possible that different clusters in the network will have different and non-overlapping quiet and busy periods.

Figure 5:
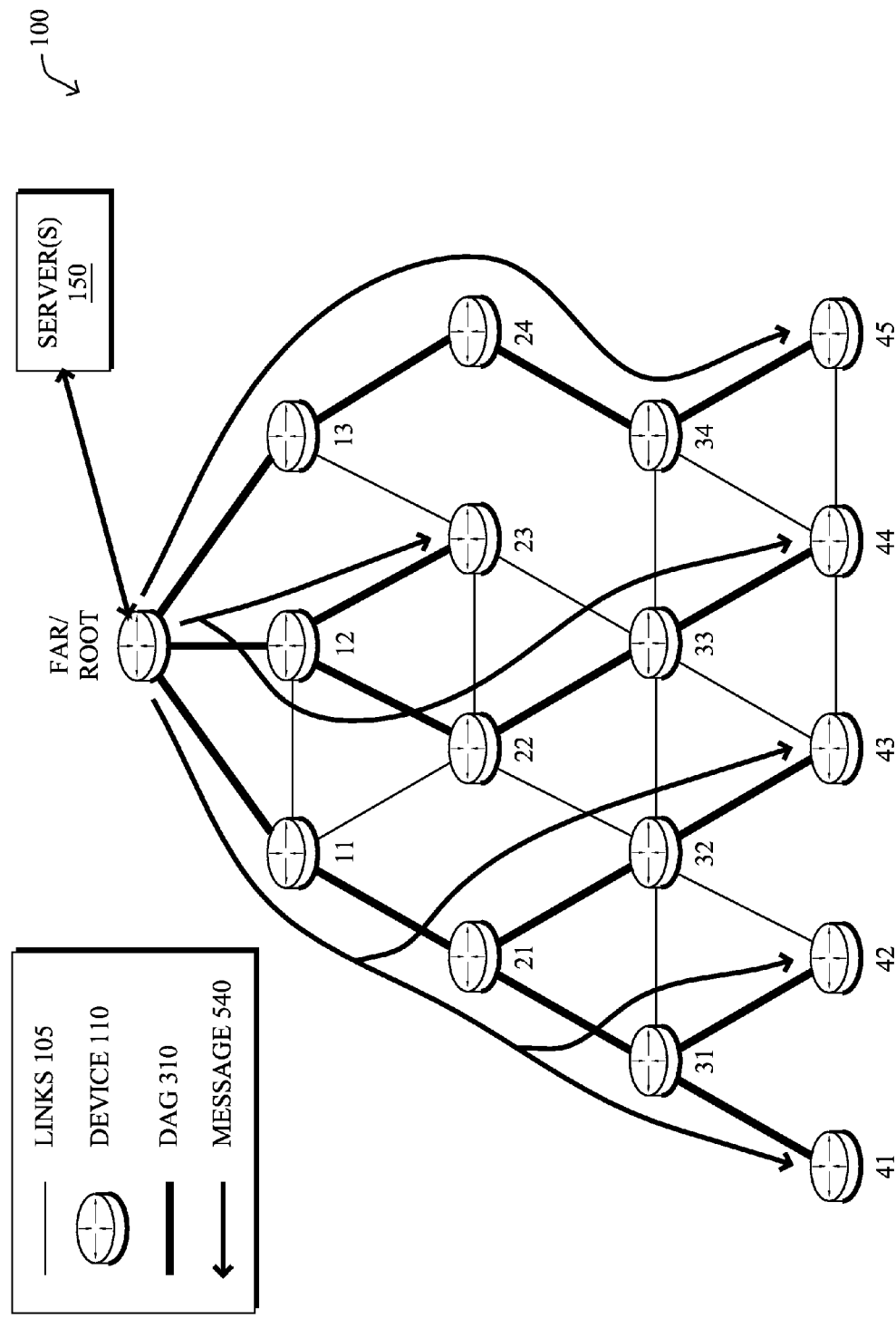
FIG. 5 illustrates an example message exchange.

In both modes, the techniques herein specify a newly defined message (that is either a multicast IPv6 message or MAC layer broadcast message) sent to those nodes in the network that are being requested to start the SMJ process (e.g., illustrative message 540 in FIG. 5). In one embodiment, if shadow joining is required for a subset S of all nodes, a bloom filter (compression technique) may be added to the SMJ request message using an optional TLV and broadcast to all nodes. Alternatively, a multicast message or multiple unicast messages may be sent. In still another embodiment, the request could indicate that all devices in the sub-DAG of a node are to perform the SMJ technique. The SMJ message may optionally contain a time T. The time T is the time instance at which nodes should start shadow joining (T=0 means substantially immediately) along with a period of time P. The time period P tells the nodes that shadow joining should start in a random time instance between T and T+P. The period P is a time interval used in the algorithm below to spread out the number of shadow joining messages in the LLNs and prevent any sudden spikes.

Upon receiving SMJ messages, each node computes a time to rejoin the PAN equal to T+I where I<P and I is a random time (to avoid a storm of shadow joining messages). Note that in this case, in contrast with complete FAN reboots where joining times may be subject to filtering, here the node rejoining the PAN systematically records and provides the joining times to the LM.

Note that in the illustrative SMJ technique, neither the FAR nor the end nodes are required to "technically" modify their current mode of operation. A node receiving an SMJ message from the FAR performs the following set of operations:

All data structures, soft states (such as the neighbor tables, routing tables, MAC information) are preserved and unchanged.

The forwarding mode of operation is modified as follows: if critical traffic is in transit, the shadow joining operation is deferred. This is because the mesh joining messages must be sent with high priority and may compete with the user traffic, leading to incorrect joining times (or other network performance metric of interest) and may also impact the QoS of high priority traffic. In yet another embodiment, the node may reroute its priority traffic to another PAN/Mesh if available until the shadow joining is completed.

The node calls the join( ) process, which consists in starting a new PAN joining cycle and in particular the following set of operations:
1) Discover a PAN (i.e. a specific network in IEEE 802.15.4 terminology);
2) Perform 802.1x-based mutual authentication and obtain link security keys;
3) Discover a default route (e.g. by using RPL, which by itself involves a number of steps);
4) Configure a global IPv6 address (e.g. by using DHCPv6);
5) Advertise global IPv6 address to configure downward routes (e.g. by using RPL); and
6) Register with the NMS.

Figure 6:
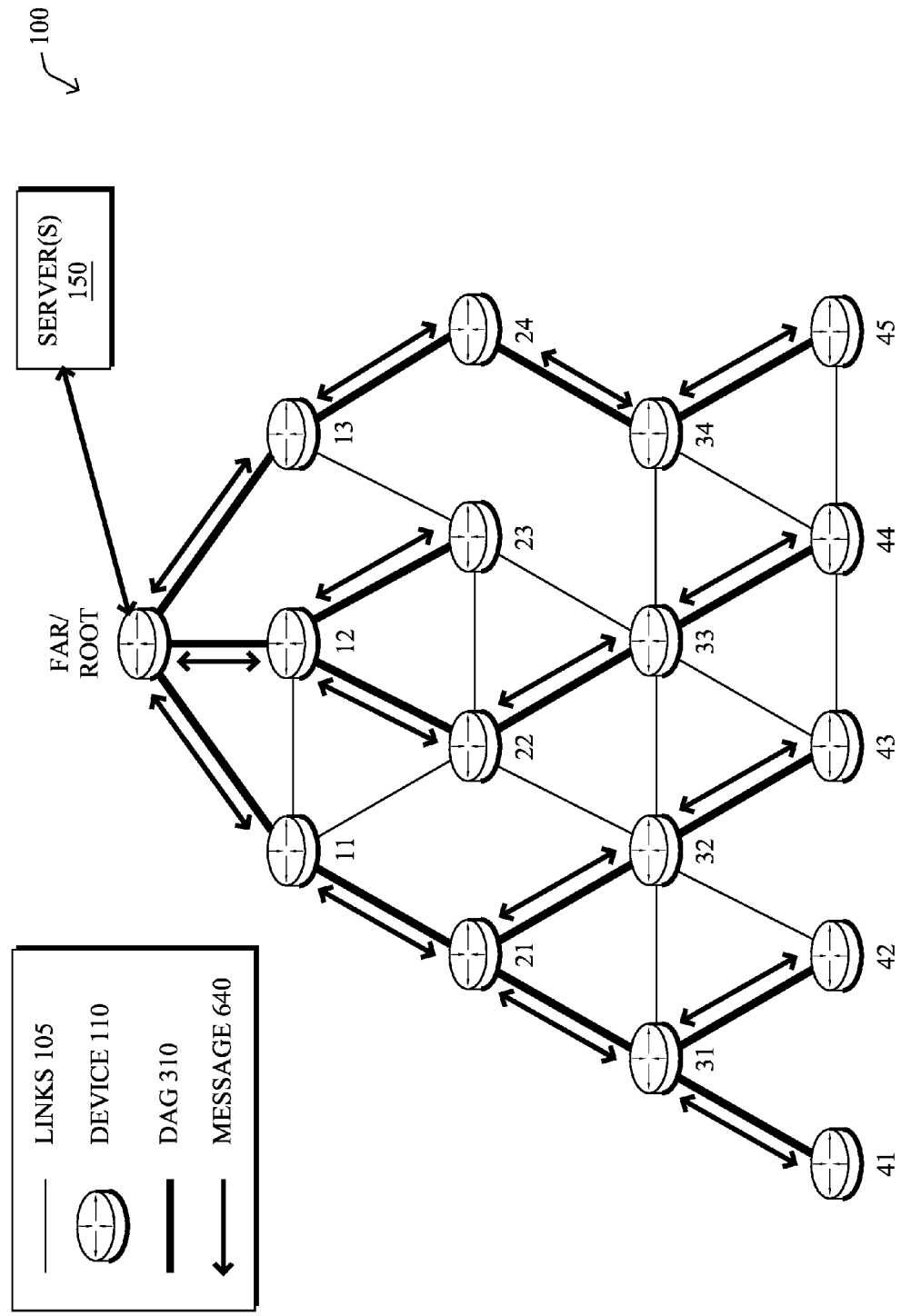
FIG. 6 illustrates an example shadow joining message exchange.

In one embodiment, the Join( ) process is implemented by having the node join the same PAN. Because the node is already joined to the PAN, some messages (e.g., messages 640 in FIG. 6) must be marked to indicate which ones are the "real" messages used to maintain the existing network and which ones are the "fake" messages used to perform the shadow joining process. Newly defined flags and TLVs are specified for use within IEEE 802.15.4 beacons, 802.1x EAPoL, DHCP, RPL, and CSMP messages (all messages 640, generally). The "fake" indicators for the beacon are used to allow devices performing the SMJ to "discover" a new network while avoiding other devices from trying to join the "fake" network. Similarly, a DHCP server receiving a "shadow" DHCP request would allocate a "fake" address such as a non-routable address (e.g., 10.0.0.0) in order to not withdraw actual routable address from its address pool. In contrast, exchanges of security keys are unmodified.

Figure 7:
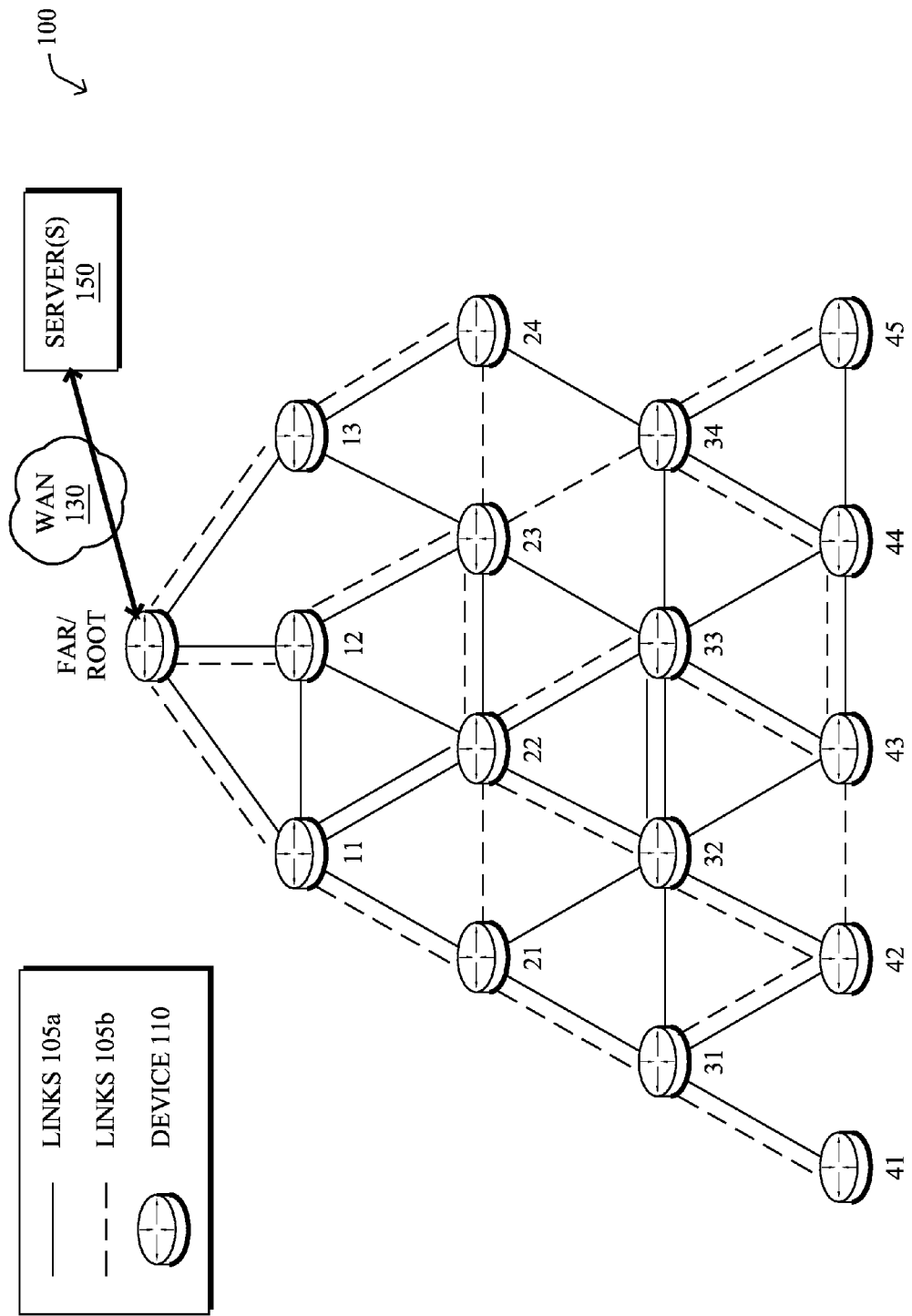
FIG. 7 illustrates an example of a second computer network.

In another embodiment, the FAR could start a second PAN by advertising a new PAN (in addition to the existing PAN) on its WPAN interface. This requires devices to be capable of joining more than one PAN simultaneously. The advantage of this approach is that it does not require any modification of existing messages, since the nodes are truly joining another PAN. An example of this is shown in FIG. 7, with multiple networks (PANs, FANs, etc.) shown as links 105*a* and links 105*b* (which may or may not be the same). Notably, an additional DAG may also be formed for routing purposes, but the additional DAG on the second PAN is not shown for clarity.

In one embodiment, should the node experience congestion (queuing delays, lack of energy or memory resource, etc.), the node may simply ignore the request or report its inability to satisfy the request. This should be a rare event if the time T has been computed to fit in quiet period by a learning machine.

Figure 8:
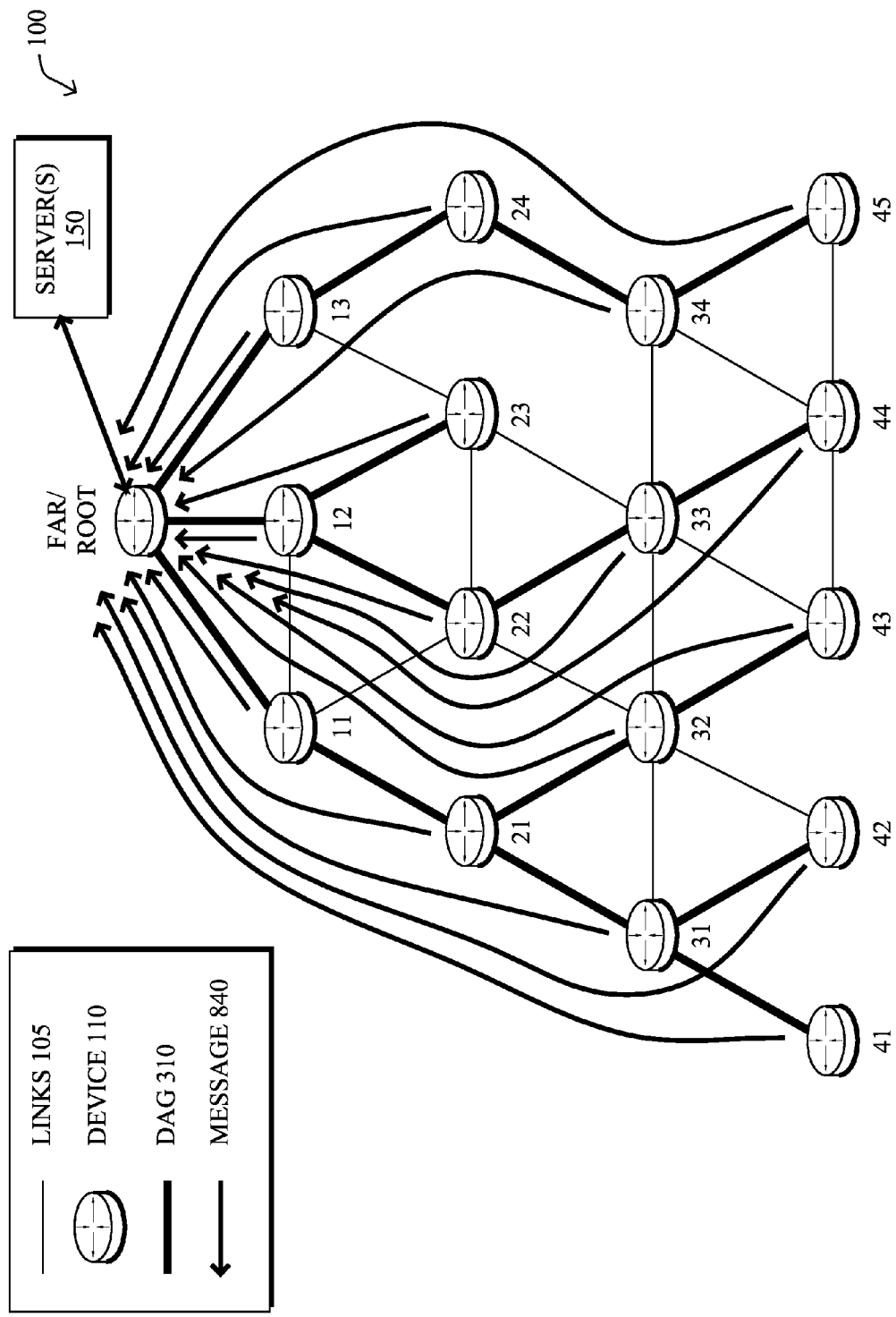
FIG. 8 illustrates an example metric reporting.

Once the Join( ) process is complete, the joining time (or any other network performance metric related to PAN/mesh formation) is recorded and T[i] value is provided to the LM (or FAR, or NMS, etc.), as shown in FIG. 8 (messages 840, which may, though need not, follow any particular DAG 310).

Note that compared to restarting a PAN, because devices are participating fully in an existing network during the shadow mesh joining process, the joining times measured may be longer than in the case where devices are dedicated to forming a mesh. In one embodiment, the LM could attempt to determine any additional delays if additional information is available (e.g., traffic matrix, delay measurements, etc.) and adjust the joining times during the training process.

Figure 9:
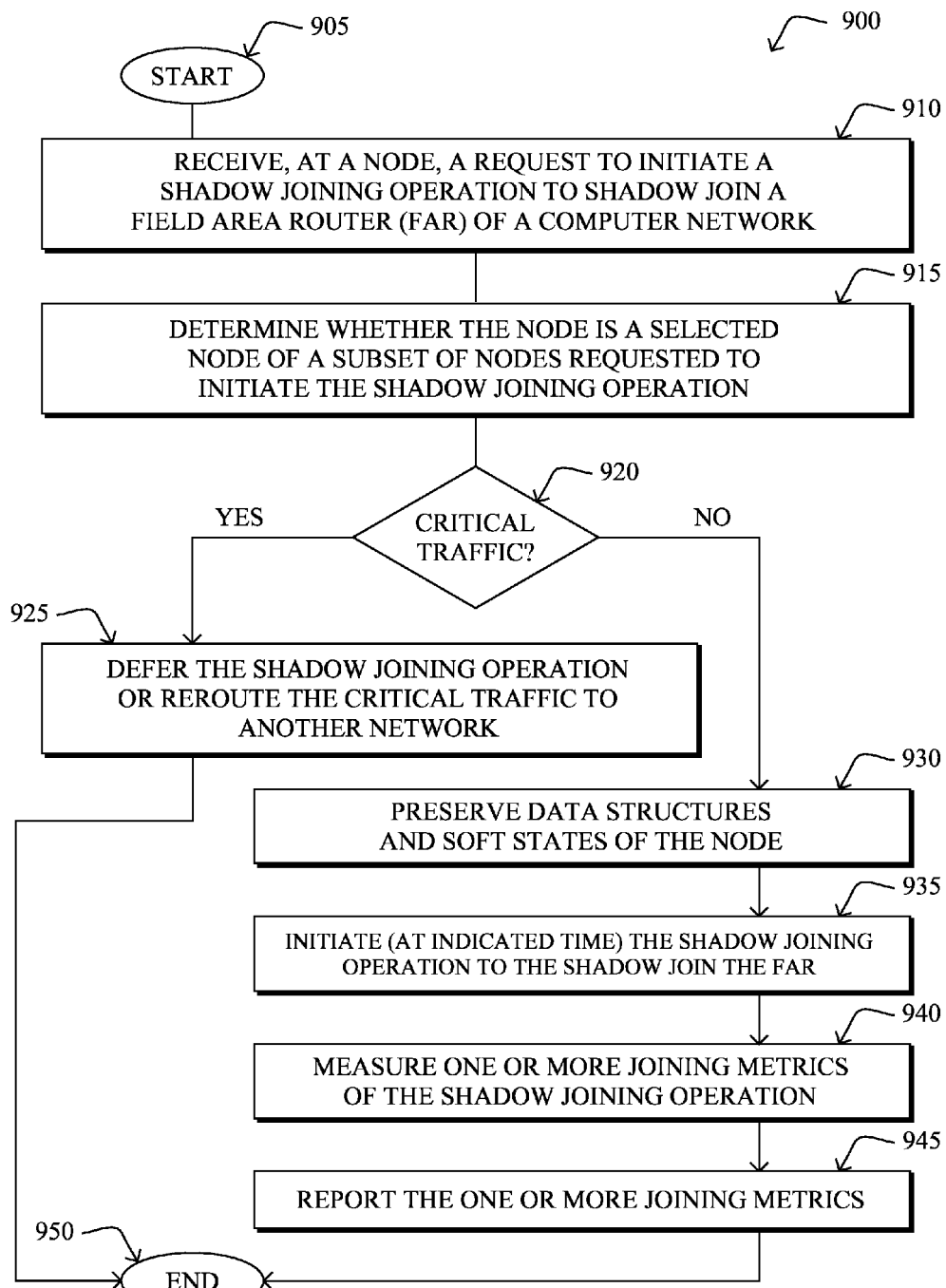
FIGS. 9-10 illustrate example simplified procedures for shadow joining in accordance with one or more embodiments described herein.

FIG. 9 illustrates an example simplified procedure 900 for shadow joining in accordance with one or more embodiments described herein, from the perspective of a node. The procedure 900 may start at step 905, and continues to step 910, where, as described in greater detail above, a node receives a request to initiate a shadow joining operation to shadow join a FAR of a computer network. In step 915, the node may determine whether it is a selected node of a subset of nodes requested to initiate the shadow joining operation, as described above. Also, in step 920, the node may determine that it has critical traffic, and if so, then in step 925 defers the shadow joining operation or reroutes the critical traffic to another network during the shadow joining operation. Assuming the operation is set to proceed, then in step 930 the data structures and soft states of the node are preserved (e.g., neighbor tables, routing tables, media access control (MAC) information, addresses, etc.).

Once an indicated time (e.g., in the request) for the shadow joining operation is reached, and based on selecting a time within an indicated duration during which the node is to initiate the shadow joining operation, in step 935 the node initiates the shadow joining operation to shadow join the FAR, where, as described above, shadow joining comprises preforming join operations without leaving a currently joined-FAR. This may be performed by creating a new computer network at the FAR while maintaining an original computer network at the FAR, or else within an original computer network using indicators that messages associated with the shadow joining operation are for the shadow joining operation (e.g., and receiving a fake network address for the node for the shadow joining operation), as described in detail above.

In step 940, the node measures one or more joining metrics of the shadow joining operation (e.g., join time, authentication times, address allocation times, etc.), and reports them in step 945, such as to the FAR, an NMS, an LM, etc. The procedure 900 ends in step 950, notably with the ability to have aborted the shadow joining operation (e.g., in response to inability to comply with the shadow joining operation) and reporting the aborting, accordingly.

Figure 10:
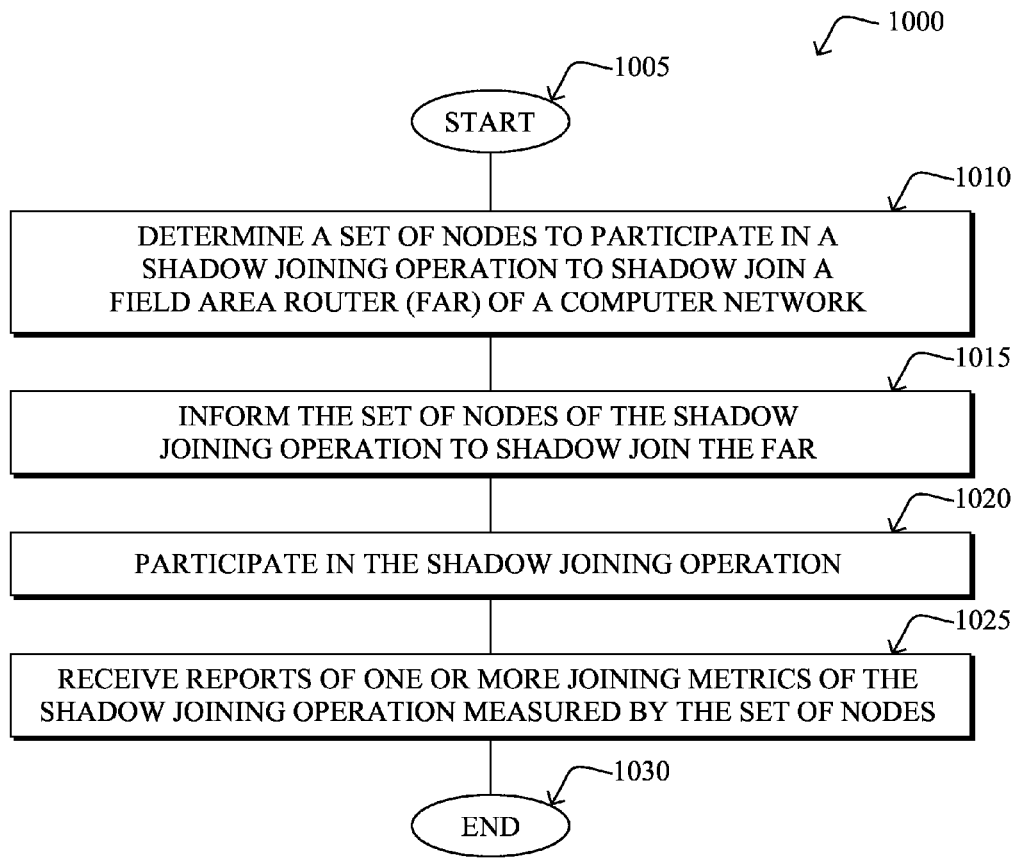

In addition, FIG. 10 illustrates an example simplified procedure for shadow joining in accordance with one or more embodiments described herein, from the perspective of a FAR (or other management device). The procedure 1000 may start at step 1005, and continues to step 1010, where, as described in greater detail above, a set of nodes to participate in a shadow joining operation to shadow join a FAR is determined, such as where the set of nodes comprises one of either all of the nodes in the computer network or a subset of the nodes. Accordingly, in step 1015, the set of nodes are informed of the shadow joining operation to shadow join the FAR, again optionally including within the informing (request) one or both of a time for the shadow joining operation and a duration during which the set of nodes are to initiate the shadow joining operation. In step 1020 the device (e.g., FAR) participates in the shadow joining operation, as detailed above, and in step 1025 may receive reports of one or more joining metrics of the shadow joining operation measured by the set of nodes. (If the device is the FAR, the reports may be forwarded to an NMS, LM, etc.) The procedure 1000 may then end in step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for fast learning to train learning machines using shadow joining. In particular, the techniques herein allow for fast training of a Learning Machine performing regression on training sets in order to perform anomaly detection. Accordingly, the Learning Machine becomes operational very quickly, without impacting the network operation.

While there have been shown and described illustrative embodiments that provide for fast learning to train learning machines using shadow joining, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node, a request to initiate a shadow joining operation to shadow join a field area router (FAR) of a computer network, wherein the FAR is a root node and the shadow joining operation triggers a fake joining sequence with the FAR in order to measure one or more joining metrics that are provided to a learning machine process executing on the node;
   preserving data structures and soft states of the node;
   initiating the shadow joining operation to shadow join the FAR, wherein shadow joining comprises preforming join operations without leaving currently joined-FARs;
   measuring the one or more joining metrics of the shadow joining operation; and
   reporting the one or more joining metrics.

2. The method as in claim 1, further comprising:
   determining whether the node is a selected node of a subset of nodes requested to initiate the shadow joining operation.

3. The method as in claim 1, wherein the request indicates a time for the shadow joining operation.

4. The method as in claim 1, wherein the request indicates a duration during which the node is to initiate the shadow joining operation.

5. The method as in claim 1, wherein the data structures and soft states are selected from a group consisting of: neighbor tables, routing tables, media access control (MAC) information, and addresses.

6. The method as in claim 1, further comprising:
   determining that the node has critical traffic; and in response,
   deferring the shadow joining operation.

7. The method as in claim 1, further comprising:
   determining that the node has critical traffic; and in response,
   rerouting the critical traffic to another network during the shadow joining operation.

8. The method as in claim 1, wherein the shadow joining operation creates a new computer network at the FAR while maintaining an original computer network at the FAR.

9. The method as in claim 1, wherein the shadow joining operation is performed within an original computer network using indicators that messages associated with the shadow joining operation are for the shadow joining operation.

10. The method as in claim 9, further comprising:
    receiving a fake network address for the node for the shadow joining operation.

11. The method as in claim 1, wherein the one or more join metrics are selected from a group consisting of: a join time, an authentication time, and an address allocation time.

12. The method as in claim 1, further comprising:
aborting the shadow joining operation in response to inability to comply with the shadow joining operation; and
reporting the aborting.

13. A method, comprising:
determining a set of nodes to participate in a shadow joining operation to shadow join a field area router (FAR) of a computer network, wherein the FAR is a root node and the shadow joining operation triggers a fake joining sequence with the FAR in order to measure one or more joining metrics that are provided to a learning machine;
informing the set of nodes of the shadow joining operation to shadow join the FAR;
participating in the shadow joining operation, wherein shadow joining comprises nodes preforming join operations without leaving currently joined-FARs;
receiving reports of the one or more joining metrics of the shadow joining operation measured by the set of nodes.

14. The method as in claim 13, wherein the set of nodes comprises one of either all of the nodes in the computer network or a subset of the nodes.

15. The method as in claim 13, wherein the informing indicates one or both of a time for the shadow joining operation and a duration during which the set of nodes are to initiate the shadow joining operation.

16. The method as in claim 13, wherein the shadow joining operation creates a new computer network at the FAR while maintaining an original computer network at the FAR.

17. The method as in claim 13, wherein the shadow joining operation is performed within an original computer network using indicators that messages associated with the shadow joining operation are for the shadow joining operation.

18. The method as in claim 13, wherein the one or more join metrics are selected from a group consisting of: a join time, an authentication time, and an address allocation time.

19. An apparatus, comprising:
one or more network interfaces to communicate with a computer network;
a processor coupled to the network interfaces and adapted to execute one or more processes; and
a memory configured to store a process executable by the processor, the process when executed operable to:
receive, as a node, a request to initiate a shadow joining operation to shadow join a field area router (FAR) of the computer network, wherein the FAR is a root node and the shadow joining operation triggers a fake joining sequence with the FAR in order to measure one or more joining metrics that are provided to a learning machine;
preserve data structures and soft states of the node;
initiate the shadow joining operation to shadow join the FAR, wherein shadow joining comprises preforming join operations without leaving currently joined-FARs;
measure the one or more joining metrics of the shadow joining operation; and
report the one or more joining metrics.

20. The apparatus as in claim 19, wherein the process when executed is further operable to:
determine that the node has critical traffic; and in response,
determine whether to defer the shadow joining operation or reroute the critical traffic to another network during the shadow joining operation.

21. The apparatus as in claim 19, wherein the shadow joining operation defines whether the operation creates a new computer network at the FAR while maintaining an original computer network at the FAR, or is performed within an original computer network using indicators that messages associated with the shadow joining operation are for the shadow joining operation.

22. An apparatus, comprising:
one or more network interfaces to communicate with a computer network;
a processor coupled to the network interfaces and adapted to execute one or more processes; and
a memory configured to store a process executable by the processor, the process when executed operable to:
determine a set of nodes to participate in a shadow joining operation to shadow join a field area router (FAR) of the computer network, wherein the FAR is a root node and the shadow joining operation triggers a fake joining sequence with the FAR in order to measure one or more joining metrics that are provided to a learning machine;
inform the set of nodes of the shadow joining operation to shadow join the FAR;
participate in the shadow joining operation, wherein shadow joining comprises nodes preforming join operations without leaving currently joined-FARs;
receive reports of the one or more joining metrics of the shadow joining operation measured by the set of nodes.

23. The apparatus as in claim 22, wherein the shadow joining operation defines whether the operation creates a new computer network at the FAR while maintaining an original computer network at the FAR, or is performed within an original computer network using indicators that messages associated with the shadow joining operation are for the shadow joining operation.

* * * * *